US010965612B2

(12) United States Patent
Shankar et al.

(10) Patent No.: US 10,965,612 B2
(45) Date of Patent: Mar. 30, 2021

(54) ACCESS MANAGEMENT SYSTEM WITH A RESOURCE-OWNERSHIP POLICY MANAGER

(71) Applicant: MICROSOFT TECHNOLOGY LICENSING, LLC, Redmond, WA (US)

(72) Inventors: Chetan Shankar, Redmond, WA (US); LiLei Cui, Sammamish, WA (US); Christopher Michael Jeffords, Bothell, WA (US); Sandeep Kalarickal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/458,170

(22) Filed: Jun. 30, 2019

(65) Prior Publication Data

US 2020/0412665 A1  Dec. 31, 2020

(51) Int. Cl.
*G06F 15/173* (2006.01)
*H04L 12/911* (2013.01)
*H04L 12/927* (2013.01)
*H04L 29/06* (2006.01)
*H04L 12/24* (2006.01)

(52) U.S. Cl.
CPC ........ *H04L 47/781* (2013.01); *H04L 41/0893* (2013.01); *H04L 41/28* (2013.01); *H04L 47/808* (2013.01); *H04L 63/101* (2013.01); *H04L 63/105* (2013.01); *H04L 63/20* (2013.01)

(58) Field of Classification Search
CPC ... H04L 47/781; H04L 41/0893; H04L 41/28; H04L 47/808; H04L 63/101; H04L 63/105; H04L 63/20
USPC ................................ 709/223, 225, 226, 229
See application file for complete search history.

(56) References Cited

U.S. PATENT DOCUMENTS

| 8,321,871 B1 * | 11/2012 | Jackson ................. G06F 9/5027 718/104 |
| 9,465,951 B1 * | 10/2016 | Cudmore ............ G06F 21/6218 |
| 2008/0155100 A1 * | 6/2008 | Ahmed .................. G06F 9/5061 709/226 |
| 2014/0108543 A1 * | 4/2014 | Windust .................. H04L 67/20 709/204 |

(Continued)

*Primary Examiner* — Liang Che A Wang
(74) *Attorney, Agent, or Firm* — Shook, Hardy & Bacon L.L.P.

(57) ABSTRACT

Methods, systems, and computer storage media for providing access to computing environments are provided. Based on a resource-ownership policy manager (i.e., a self-service engine and a runtime policy evaluation engine) that provides resource-ownership policy operations executed to apply a resource owner's policies only on resource owned by the resource owner. In operation, at runtime, a first resource instance is identified and an entity is determined to be the resource owner of the first policy and first resource instance. The first policy is applied to the first resource instance because the entity owns both the first policy and the first resource instance. A second resource instance is identified and the entity is determined not to be the resource owner of the second resource instance. A second resource policy of the entity is not applied to the second resource instance because the entity is not the owner of the second resource instance.

20 Claims, 7 Drawing Sheets (56) References Cited

U.S. PATENT DOCUMENTS

| | | | |
|---|---|---|---|
| 2015/0236973 A1* | 8/2015 | Jackson | G06F 9/5072 709/226 |
| 2018/0234459 A1* | 8/2018 | Kung | H04L 63/0263 |
| 2019/0098056 A1* | 3/2019 | Pitre | H04L 63/20 |

* cited by examiner

FIG. 7

US 10,965,612 B2

ACCESS MANAGEMENT SYSTEM WITH A RESOURCE-OWNERSHIP POLICY MANAGER

BACKGROUND

Users often rely on computing resources such as applications and services to perform various computing tasks. Distributed computing environments can support building, deploying, and managing applications and services. Users and enterprises are moving away from traditional computing environments to run their applications and services on distributed computing environments. Distributed computing environments implement security mechanisms (e.g., access control manager resource policies) to ensure the security of different types of computing resources in the distributed computing environments. As distributed computing environments increasingly support applications and services, providing both improved secure provisioning of access to computing resources and data security in distributed computing environments is important.

SUMMARY

Various aspects of the technology described herein are generally directed to systems, methods, and computer storage media, for among other things, providing resource policy management for an access management system in a distributed computing environment ("computing environment") based on a resource-ownership policy manager. In particular, the resource-ownership policy manager provides resource-ownership policy operations that are executed to apply a resource owner's policies exclusively on resource instances owned by the resource owner. The resource-ownership policy operations help circumvent errors in policies, where a policy is written for a resource instance that is not explicitly owned by the owner of the policy. A policy with erroneous enumeration of a resource instance (not owned by the policy author) is not applied to a resource instance based on first evaluating resource ownership of the resource instance. In this regard, the distributed computing system access management team can securely delegate managing of resource policies to the corresponding resource owners of resource instances, while the resource-ownership policy operations prevent incorrect application of policies to resource instances in the computing environment.

By way of background, in distributed computing environments, in order to ensure security, access restrictions have been implemented on a significant number of resources to allow requestors only temporary access to the resources. Adding more resources for temporary access has resulted in an increased number of policy related requests. Policy related requests to the access control managers (e.g., Just-In-Time system) generate significant workload for access management system teams. Policy requests in an access control manager can include requests to create or modify policies (e.g., a project manager "policy author" drafts a policy for resources for a service team) or a request to analyze policy evaluation results for a policy (e.g., questions about a rejected policy).

Conventional access management systems that support policies often lack a simplified implementation of resource policy management, in that, there exists policy drafting and policy implementation concerns when a computing environment supports a diverse number of policies for a large number of separately owned resources. There are limited mechanisms or safeguards in conventional access management systems for streamlining how policy authors draft policies while limiting the impact of policy drafting errors in the computing environment. For example, a policy written for access to a specific fabric (e.g., fabric controller A) which is implemented via the access control manager to grant access incorrectly to all fabric controllers is not appropriate. As such, an alternative approach for providing resource policy management that can provide consistent application of policies to resource instances in computing environments would improve computing operations for more secure and efficient application of policies.

Aspects of the technical solution described in the present disclosure are directed towards improving resource policy management in an access management system of a distributed computing environment ("computing environment") based on a resource-ownership policy manager (i.e., a self-service engine and a runtime policy evaluation engine) that provides resource-ownership policy operations that are executed to apply a resource owner's policies exclusively on resource instances owned by the resource owner. The self-service engine provides a user interface for a resource owner (e.g., an entity assigned ownership of a resource instance) to manage (e.g., create, update, control, and delete) policies for their own resources in the computing environment. In particular, at drafting time, the self-service engine does not evaluate enumerated resource instances in a policy; however, using the resource-ownership policy operations circumvent errors in policies, where a policy is written for a resource instance that is not explicitly owned by the owner of the policy. The runtime policy evaluation engine supports (at runtime, for a given resource instance) identifying a resource owner of the resource instance, evaluating a set of policies, and applying only a subset of the set of policies associated with both the resource owner and the resource instance. As such, resource policy management provides reliable policy application on resources of computing environments based on the resource-ownership policy operations.

In operation, a policy author creates a first policy for a first resource instance and a second policy for a second resource instance. The policy author (or entity, service team) is the resource owner of the first resource instance, but the policy author in not the resource owner of the second resource instance (e.g., due to a change in ownership of the second resource instance). The first policy and the second policy are communicated to cause implementation of the first policy and the second policy. At runtime, the first resource instance is identified and the policy author is determined to be the resource owner of the first resource instance. The first policy is applied to the first resource instance because the policy author owns both the first policy and the first resource instance. At run time, the second resource instance is identified and the policy author is determined not to be the resource owner of the second resource instance. The second resource policy is not applied to the second resource instance because the policy author is not the owner of the second resource instance. As such, even with an unexpected change in ownership of a resource instance, a policy author's policy associated with the resource instance (which the policy author does not own) is not applied to the resource instance. Additional aspects of the technical solution are described below, by way of exemplary implementations, with reference to technical solution environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Overview of Aspects of the Technological Improvement

Distributed computing environments implement security mechanisms (e.g., access management systems) to ensure the security of different types of computing resources (e.g., computing access and secure user data) in the distributed computing environments. In distributed computing environments, in order to ensure security, access restrictions have been implemented on a significant number of resources to allow requestors only temporary access to the resources. Adding more resources for temporary access has resulted in an increased number of policy related requests. Policy related requests to the access control managers (e.g., Just-In-Time system) generate significant workload for access management system teams. Policy requests in an access control manager can include requests to create or modify policies (e.g., a project manager drafts a policy for resources for a service team) or request to analyze policy evaluation results for a policy (e.g., questions about a rejected policy).

By way of background, in some distributed computing environments there exists no specific model for drafting policies for resources. For example, a policy could be drafted by simply using an email system to make a request and an ad hoc judgment call (based on personnel interactions or relationships) could be made in favor of drafting the policy. Other times such a call may not be favorable and a resource is left without a policy. Additionally, even when policies are drafted, drafting policies to expressly limit access to a defined set of resources (of a service team) in a distributed computing environment can raise several challenges as well.

Conventional access management systems that support policies often lack a simplified implementation of resource policy management in that the existing resource policy model concerns when implementing a diverse number of policies for a large number of separately owned resources in a computing environment. To overcome the shortcomings of conventional resource policy model, a distributed computing environment provider may want to implement an ownership-based model in their distributed computing environment, such that a service team that owns a resource is responsible for managing (e.g., writing, owning) the policies associated with their resources. However, authoring policies to expressly limit the policy to be applied on the set of resources (of a service team) in a distributed computing environment is challenging. For example, a policy written for access to a specific fabric (e.g., fabric controller A) which is implemented via the access control manager to grant access incorrectly to all fabric controllers is not appropriate. A resource enumeration model for drafting policies, even though feasible, is cumbersome when implemented in a distributed computing environment. By way of example, a computing environment can include over 3000 fabric controllers with over 100 fabric controllers owned by service team A with 2900 fabric controllers owned by service team B. While service team A may be able to write policies that avoid impact on service team B resources, it can be far more difficult for service team B to avoid impacting service team A resources. It is challenging to write a policy clause that points only to 100 fabric controllers. As such, there are limited constructs or safeguards in conventional access management systems for streamlining how policy authors draft policies while limiting the impact of policy drafting errors on a resource instance. In addition, part of the concern is based on changes (sometime frequent) to service team ownership of resources in a computing environment, as such, policies can be applied to the wrong resource instances. As such, an alternative approach for providing resource policy management that can provide reliable policy application in computing environments would improve computing operations for more secure and efficient application of policies.

Embodiments of the present invention are directed to simple and efficient methods, systems, and computer storage media for providing resource policy management in an access management system of a distributed computing environment ("computing environment") based on a resource-ownership policy manager (i.e., a self-service engine and a runtime policy evaluation engine) that provides resource-ownership policy operations that are executed to apply a resource owner's policies exclusively on resource instances owned by the resource owner.

Figure 1:
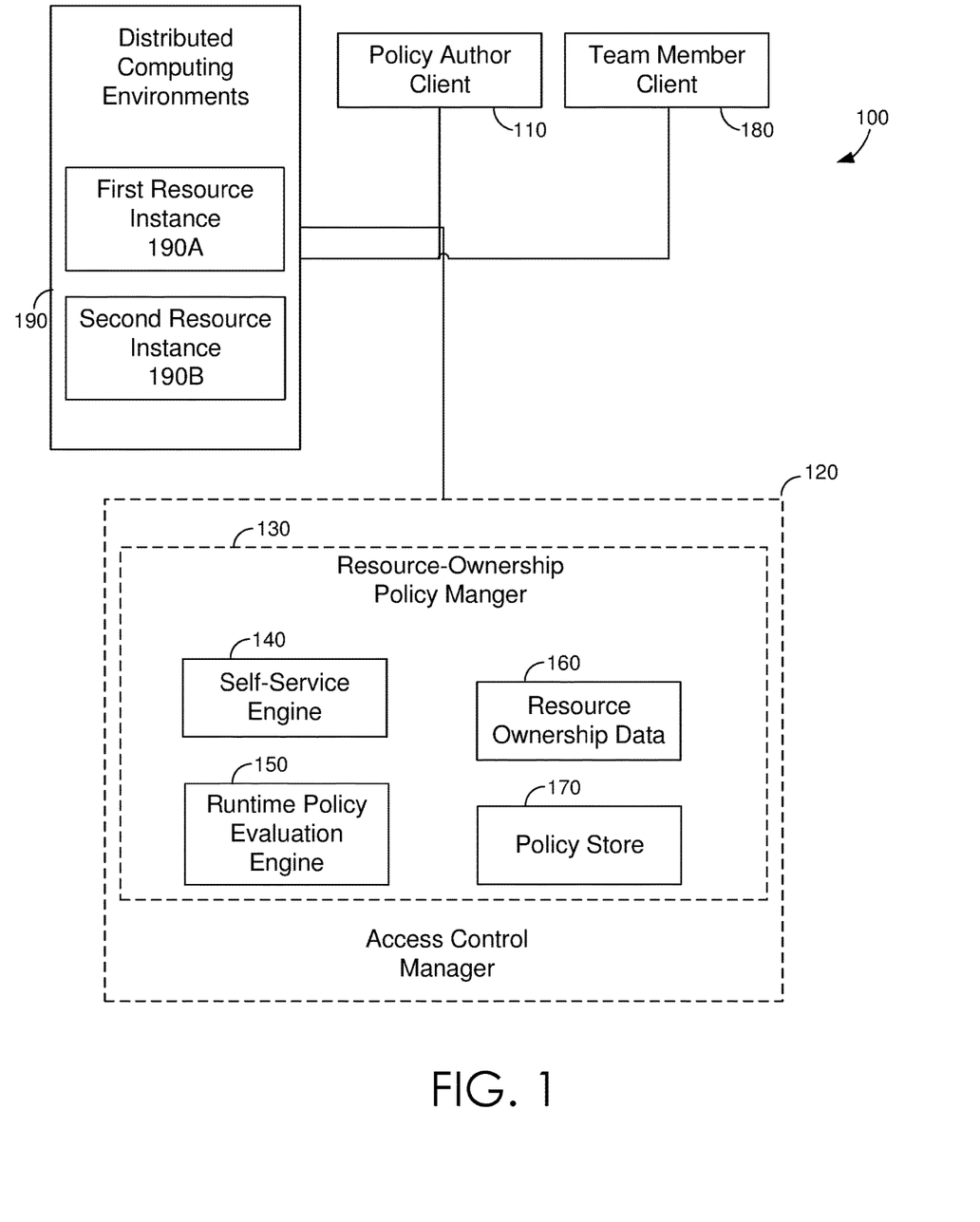
FIG. 1 is a block diagram of an exemplary access management environment for providing resource policy management operations using a resource-ownership policy manager, suitable for use in implementing aspects of the technology described herein.
Figure 2:
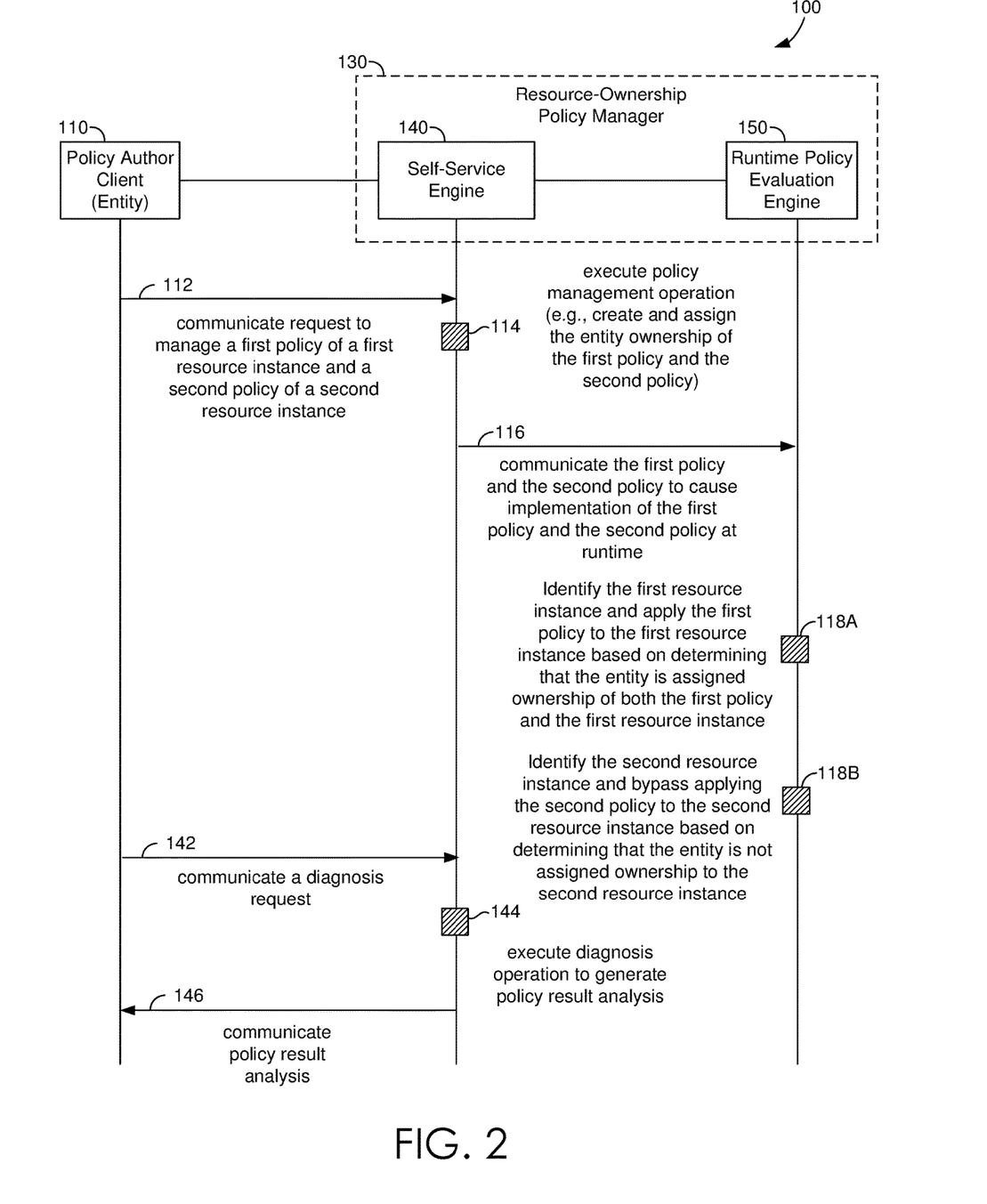
FIG. 2 is an exemplary access management environment for providing resource policy management operations using a resource-ownership policy manager in accordance with aspects of the technology described herein.

Overview of Example Environments for Providing Resource Policy Management Operations Using a Resource-Ownership Manager Aspects of the technical solution can be described by way of examples and with reference to FIG. 1 and FIG. 2. FIG. 1 and FIG. 2 are associated with an exemplary technical solution environment (access management environment 100) suitable for use in implementing embodiments of the technical solution. Generally the technical solution environment includes a technical solution system suitable for providing escorted-access management based on an escortadmin session engine. With initial reference to FIG. 1, FIG. 1 discloses access management environment 100 having policy author client 110, access control manager 120, resource-ownership policy manager 130, self-service engine 140, runtime policy evaluation engine 150, resource ownership data 160, policy store 170, team member client 180, and distributed computing environments 190.

At a high level, a resource (e.g., first resource instance 190A and second resource instance 190B) in a computing environment (e.g., distributed computing environments 190) is owned (i.e., managed) by an entity or service team (i.e., resource owner, entity assigned ownership of a resource instance). The service team can identify the technology, data, data security, integrity and other resource attributes to appropriately generate policies for the resource. A resource can be associated on or more resource owners, where each resource owner has a different scope/view of the resource. By way of example, an incident manager can own all resources associated with Service A, while a storage team owns the store associated with Service A, and an implementation team owns the folder/path associated with the store of Service A. It is contemplated that an access control manager (e.g., access control manager 120) that previously managed one or more policies may no longer directly manage the policies through a team that supports the access control manager.

The resource-ownership-based model of the technical solution described herein supports implementing only the resource owner's own policies on a selected resource instance. The resource-ownership-based model is implemented using a resource-ownership policy manager (i.e., resource-ownership policy manager 130 with a self-service engine 140 and a runtime policy evaluation engine 150) that supports resource-ownership policy operations that are executed to apply a resource owner's policies exclusively on resource instances owned by the resource owner. The self-service engine provides a user interface for a resource owner (e.g., an entity assigned ownership of a resource instance) to manage (e.g., create, update, control, and delete) policies for their own resources in the computing environment. In particular, at drafting, the self-service engine does not evaluate enumerated resource instances in a policy; however, using the resource-ownership policy operations circumvent errors in policies, where a policy is written for a resource instance that is not explicitly owned by the owner of the policy.

The runtime policy evaluation engine supports, at runtime, for a given resource instance, identifying a resource owner of the resource instance, evaluating a set of policies, and applying only a subset of the set of policies associated with both the resource owner and the resource instance. The resource owner may be identified using resource ownership data (e.g., resource ownership data 160) that store a list of resource instances and corresponding entities that are assigned ownership of the resource instances. As such, resource policy management provides reliable policy application on resources of computing environments based on the resource-ownership policy operations. Conventional access management systems did not have such a simplified implementation of resource policy management because of historical and legacy implementations, which now cannot adequately support the policy implementation demands, especially for limited-time access to computing resources.

The self-service engine supports resource-ownership policy operations that are executed to support streamlined management (e.g., create, update, delete) to resource owners and self-service for policy-related requests. For example, the self-service policy engine includes a user interface to assist in creating, editing, and deleting polices. The self-service policy engine can also support resolving modifications conflicts, validating the correctness of policies, and communicating policy diagnosis results. When policies are created, policies can be stored (e.g., in policy store 170) and associated with an entity that is assigned ownership of the policy in the policy store.

Polices can also be associated with specific zones for an ordered hierarchical application of policies to resource instances. Policies can specifically indicate the zone associated with the policy. For example, policies can be mandatory zone policies, discretionary zone policies, or legacy zone policies. The mandatory zones can include policies that should be strictly one set of policies per computing environment. The discretionary zone can include policies owned by individual service teams. The legacy zone can include policies that are mutually exclusive from discretionary zone. The higher the zone of a policy the higher the priority for implementing or superseding the policy over another policy in a zone with lower priority.

The self-service engine can support diagnosis operations (e.g., policy result analysis or policy diagnosis results) through the self-service interface. For a resource instance that has a resource owner, the diagnosis operations can parse relevant policies and communicate why the policy matching failed, and if a match resulted, what the corresponding approval request decision (e.g., auto-rejection, manual approval, auto-approval) was for the match. In some embodiments, the self-service policy engine can support diagnosis operations that support user initiated analysis requests against relevant policies for additional self-service functionality. The diagnosis operations may receive a request and scan all relevant policies (e.g., resource type, owner, computing environment). After scanning the policies, diagnosis results are generated that indicate unmatched policies. For each unmatched policy, the diagnosis results identify attributes of the policy (e.g., conditions) that caused the mismatch, and for each matched policy, the diagnosis results identify an approval request decision. The self-service policy engine can also provide a user interface to proactively provide information to a user the status of their request. For example, a button (e.g., "Why was my request rejected" or "Why does my request require approval") can be provided on the interface, such that selection of the button triggers diagnosis operations (e.g., function "Analyze_Policy_Decision") and generates the diagnosis results for the user.

The runtime policy evaluation engine supports resource-ownership policy operations that are executed to limit the impact of policy drafting errors on resource instances. At run time, a resource instance is identified in the computing environment. A resource owner is determined for the resource instance. The resource instance can be associated with several resource owners, as such a list of resource owners can be identified. The list may be a prioritized list of owners of the resource. Resource ownership data provides an inventory of owners of resources. For example, a resource ownership data service may query resources in the distributed computing environment that identify the owners of resources and provide a list of owners for the functionality described herein.

Determining the resource owner can be based on a filtering of the resource instances in the computing environment first by resource types to achieve a more efficient search performance. For example, a node resource type may be the resource type of the resource instance, as such, resource owners for the resource type are quickly identified, and then the specific list of resource owners of the resource instance are identified. In operation, a first policy is applied to a first resource instance because the policy author owns both the first policy and the first resource instance. While a second policy is not applied to the second resource instance because the policy author is not the owner of the second resource instance. As such, even with an unexpected change in ownership of a resource instance, a policy author's policy associated with a resource instance (which the policy author does not own) is not applied to the resource instance.

With reference to FIG. 2, FIG. 2 also discloses access management environment 100 with policy author client 110, resource-ownership policy manager 130 with self-service engine 140, and runtime policy evaluation engine 150.

Initially at step 112, a policy author using the policy author client 110 communicates a request to manage a first policy of a first resource instance and a second policy of a second resource instance. The request is communicated to the self-service engine 140 of the resource-ownership policy manager 130. The self-service engine executes 114 a policy management operation based on the request. For example, the self-service engine can create a policy and assign the entity ownership of the policy. As such, for the request, the entity is assigned ownership of the first policy and the second policy.

At step 116, the self-service engine 140 communicates the first policy and the second policy to cause implementation of the first policy and the second policy at runtime. The first policy and the second policy are communicated to the runtime policy evaluation engine 150. It is contemplated that the policies can be stored in a policy store (not shown) and the runtime policy retrieves the policies from the policy store. Other variations and combinations of providing the policies to the runtime policy evaluation engine 150 are contemplated with embodiments described herein.

At step 118A, the runtime policy evaluation engine 150 identifies the first resource instance and applies the first policy to the first resource instance based on determining that the entity is assigned ownership of both the first policy and the first resource instance. At step 118B, the runtime policy evaluation engine identifies the second resource instance and bypasses applying the second policy to the second resource instance based on determining that the entity is not assigned ownership of the second resource instance.

At step 142, a policy author may communicate a diagnosis request policy. For example, using a self-service interface, the policy author can trigger diagnosis operations (e.g., function "Analyze_Policy_Decision") to cause generation of policy diagnosis results. At step 144, the self-service engine 140 executes the diagnosis operation to generate policy diagnosis results. For example, the diagnosis operations can parse relevant policies and communicate why the policy matching failed, and if a match resulted, what the corresponding approval request decision (e.g., auto-rejection, manual approval, auto-approval) was for the match. At step 146, the self-service engine communicates the policy diagnosis results to the policy author client. As such, resource policy management provides reliable policy application on resources of computing environments based on the resource-ownership policy operations.

Aspects of the technical solution of this disclosure have been described with reference to several inventive features and advantages associated with the resource-ownership policy manager. The resource-ownership policy manager provides resource-ownership policy operations that are executed to apply a resource owner's policies only on resource instances owned by the resource owner. The resource-ownership policy operations help circumvent errors in policies, where a policy is written for a resource instance that is not explicitly owned by the owner of the policy. Overall, the practical application of aspects of the technical solution described results in improvements based on less CPU computation, smaller memory requirements, and increased flexibility in access management systems.

Figure 3:
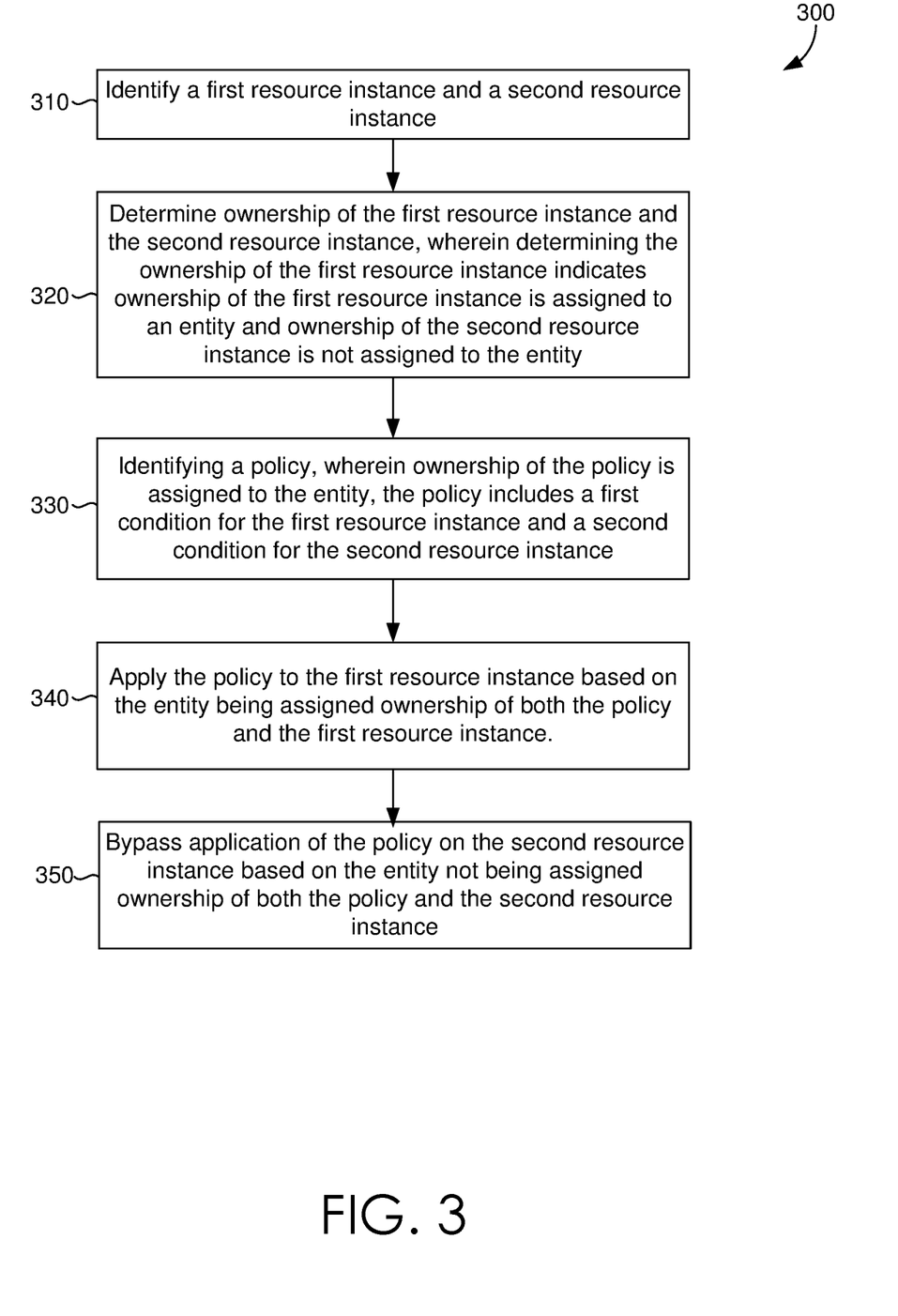
FIG. 3 provides a first exemplary method of providing resource policy management operations using a resource-ownership policy manager in accordance with aspects of the technology described herein.
Figure 4:
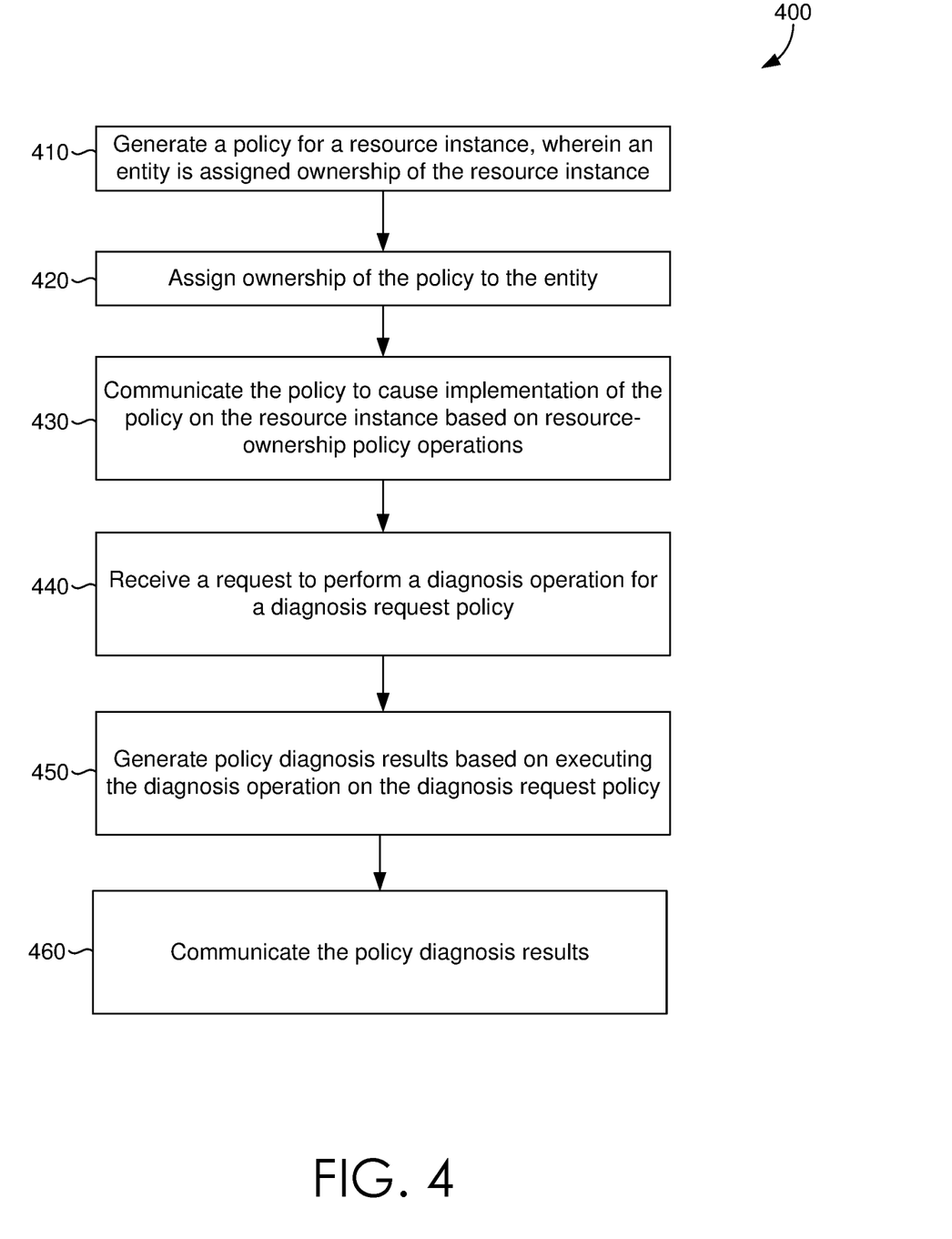
FIG. 4 provides a second exemplary method of providing resource policy management operations using a resource-ownership policy manager, in accordance with aspects of the technology described herein.
Figure 5:
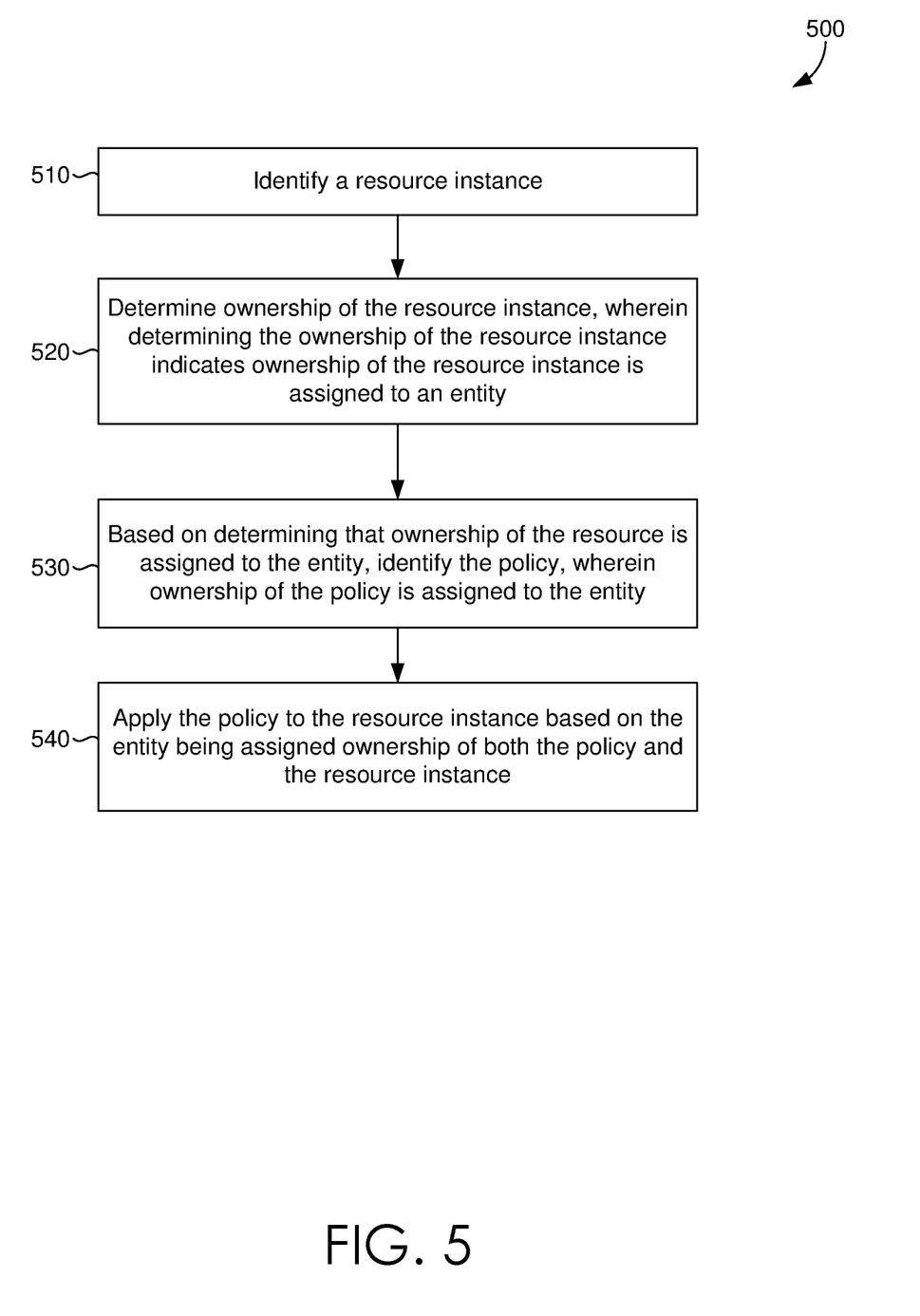
FIG. 5 provides a third exemplary method of providing resource policy management operations using a resource-ownership policy manager, in accordance with aspects of the technology described herein.

Exemplary Methods for Providing Resource Policy Management Based on Resource-Ownership Policy Operations With reference to FIGS. 3, 4 and 5, flow diagrams are provided illustrating methods for providing resource policy management for distributed computing environments based on resource-ownership policy operations. The methods may be performed using the access management environment described herein. In embodiments, one or more computer storage media having computer-executable instructions embodied thereon that, when executed, by one or more processors can cause the one or more processors to perform methods in the resource policy management environment.

Turning to FIG. 3, a flow diagram is provided that illustrates a method 300 for providing resource policy management for distributed computing environments based on resource-ownership policy operation. Initially at block 310, a first resource instance and a second resource instance are identified. At block 320, ownership of the first resource instance and the second resource instance is determined. Determining the ownership of the first resource instance indicates ownership of the first resource instance is assigned to an entity and ownership of the second resource instance is not assigned to the entity. At block 330, a policy is identified. Ownership of the policy is assigned to the entity. The policy includes a first condition for the first resource instance and a second condition for the second resource instance. At block 340, the policy is applied to the first resource instance based on the entity being assigned ownership of both the policy and the first resource instance. At block 350, application of the policy is bypassed on the second resource instance based on the entity not being assigned ownership of both the policy and the second resource instance.

Turning to FIG. 4, a flow diagram is provided that illustrates a method 400 for providing resource policy management for distributed computing environments based on resource-ownership policy operations. Initially at block 410, a policy is generated for a resource instance. An entity is assigned ownership of the resource instance. At block 420, the ownership of the policy is assigned to the entity. At block 430, the policy is communicated to cause implementation of the policy on the resource instance based on resource-ownership policy operations. At block 440, a request to perform a policy diagnosis operation on the policy is received. At block 450, policy evaluation results are generated based on executing the policy diagnosis operation on the policy. At block 460, the policy diagnosis results are communicated.

Turning to FIG. 5, a flow diagram is provided that illustrates a method 500 providing resource policy management for distributed computing environments based on resource-ownership policy operations. Initially at block 510, a resource instance is identified. At block 520, ownership of the resource instance is determined. Determining ownership of the resource instance indicates ownership of the resource instance is assigned to an entity. At block 530, based on determining that ownership of the resource is assigned to the entity, a policy is identified. The policy is associated with the resource instance. Ownership of the policy is assigned to the entity. At block 540, the policy is applied to the resource instance based on the entity being assigned ownership of both the policy and the resource instance.

Example Access Management System

Figure 6:
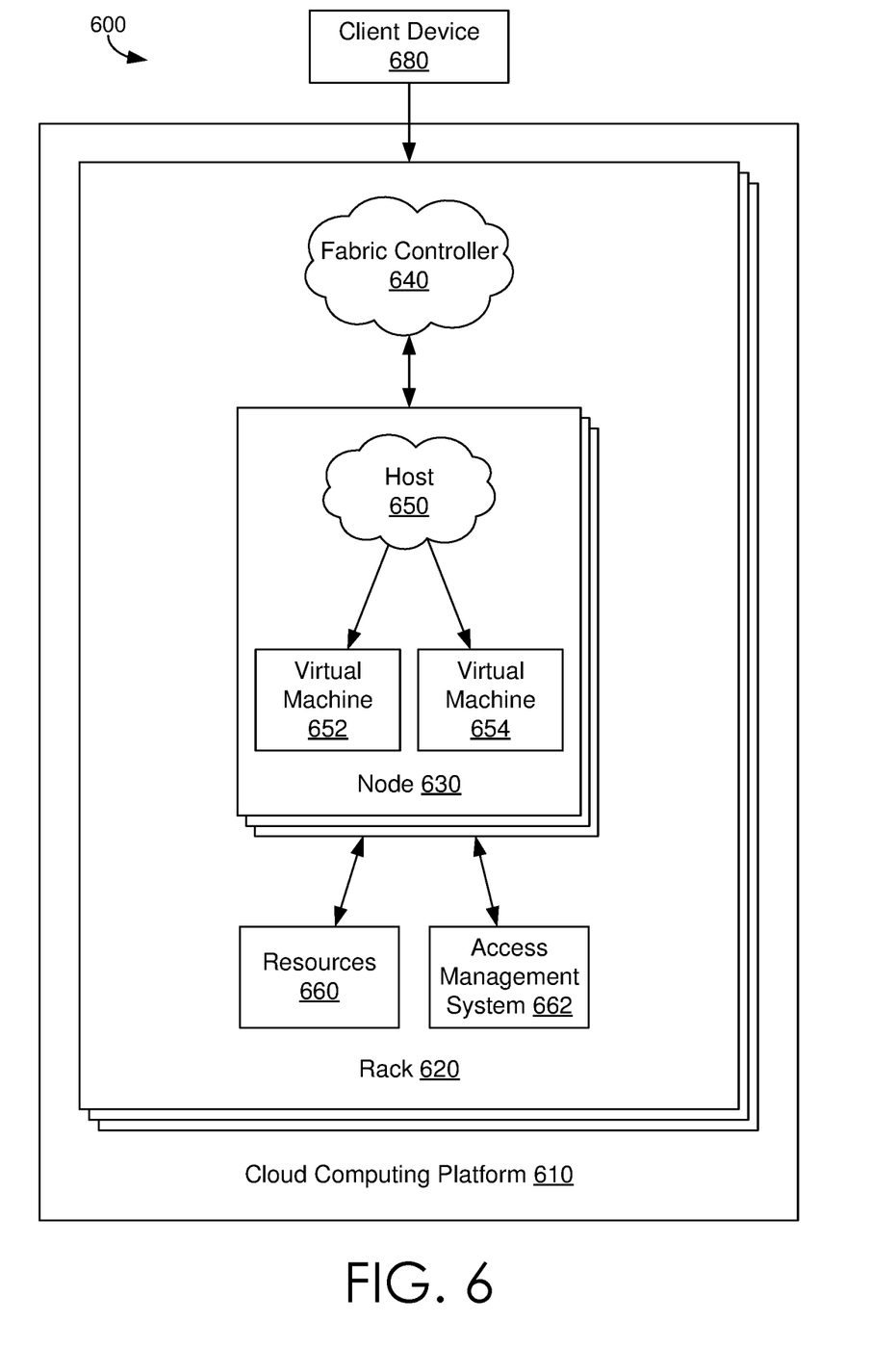
FIG. 6 provides a block diagram of an exemplary distributed computing environment suitable for use in implementing aspects of the technology described herein.

With initial reference the access management system 662 of FIG. 6, at a high level, access management (or access control) can refer to computing security processes and components that provide computer security based on identification, authorization, authentication, access approval, and auditing. An access management system can be implemented in a distributed computing environment to limit access to distributed computing environment resources. The access management system can be specifically implemented as a time-limited controlled access management system (e.g., Just-In-Time "JIT" service). By way of example, a Just-in-Time access management system can be a context-based access management system that provides temporary access to requesters to resources based on security policies. These policies can be designed as an ordered sequence of condition-action rules. When a request is submitted, it is evaluated against applicable rules in sequence and the results of the last matching action are taken to be the result of the policy evaluation. The result involves granting access to a resource with or without human approval or automatically denying the request. The JIT system applies the result, and when an access request is granted, the JIT system monitors the access and once it expires the access is revoked.

Time-limited controlled access can advantageously be used to lock down inbound traffic to virtual machines to reduce exposure to attacks, while providing easy access to virtual machines when needed. By way of example, when access management is enabled for a resource (e.g., VM), an access management system 662 can lock down inbound traffic to the resource by creating a network security group (NSG) rule. The resource, for example, may be a VM and selected ports are locked down and controlled using the access management system 662. As such, when a user requests access to a VM, the access management system 662 (e.g., a security center) checks that the user has a role-based access control permission that permits the user to successfully request to access the VM. If the request is approved, the security center can automatically configures a network security group (e.g., NSG) to allow inbound traffic to a selected port and requested source IP addresses or ranges, for the amount of time that was specified. After the time has ended (or expired), the security center restores the NSGs to previous states, while keeping the connections that are already established uninterrupted.

The access management system can support different types of policies for controlling access to resources. A VM can be configured to operate with a selected policy or group of policies. In an example implementation, when a VM is enabled for access management, the access management system 662 can create a "deny all inbound traffic" for selected ports; however, other manual port settings can also be configured. When requesting access to a VM, a user may identify the ports that the user wants to open and the source IP addresses that the port is opened on and the time window for which the port will be open. The access management system 662 may support requesting access to the ports that are configured in the policy. It is contemplated that each port may have a maximum allowed time derived from the policy.

The access management system 662 can further support auditing access activity by way of a log search. Permissions can be configured to limit access to configuring and use of the access management system 662. The access management system 662 can also optionally be configured programmatically. For example, representational state transfer (REST) APIs can be used to programmatically get information about configured VMs, add new ones, request access to a VM, and more.

Example Distributed Computing Environment

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 for provisioning and managing resource allocation, deployment, upgrade, and management of cloud services. Typically, cloud computing platform 610 acts to store data or run service applications in a distributed manner. Cloud computing platform 610 in a data center can be configured to host and support operation of endpoints of a particular service application. Cloud computing platform 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610 and an access management system 662 (e.g., access control manager). It is contemplated that resources can be configured for specific service applications.

Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Operating Environment

Figure 7:
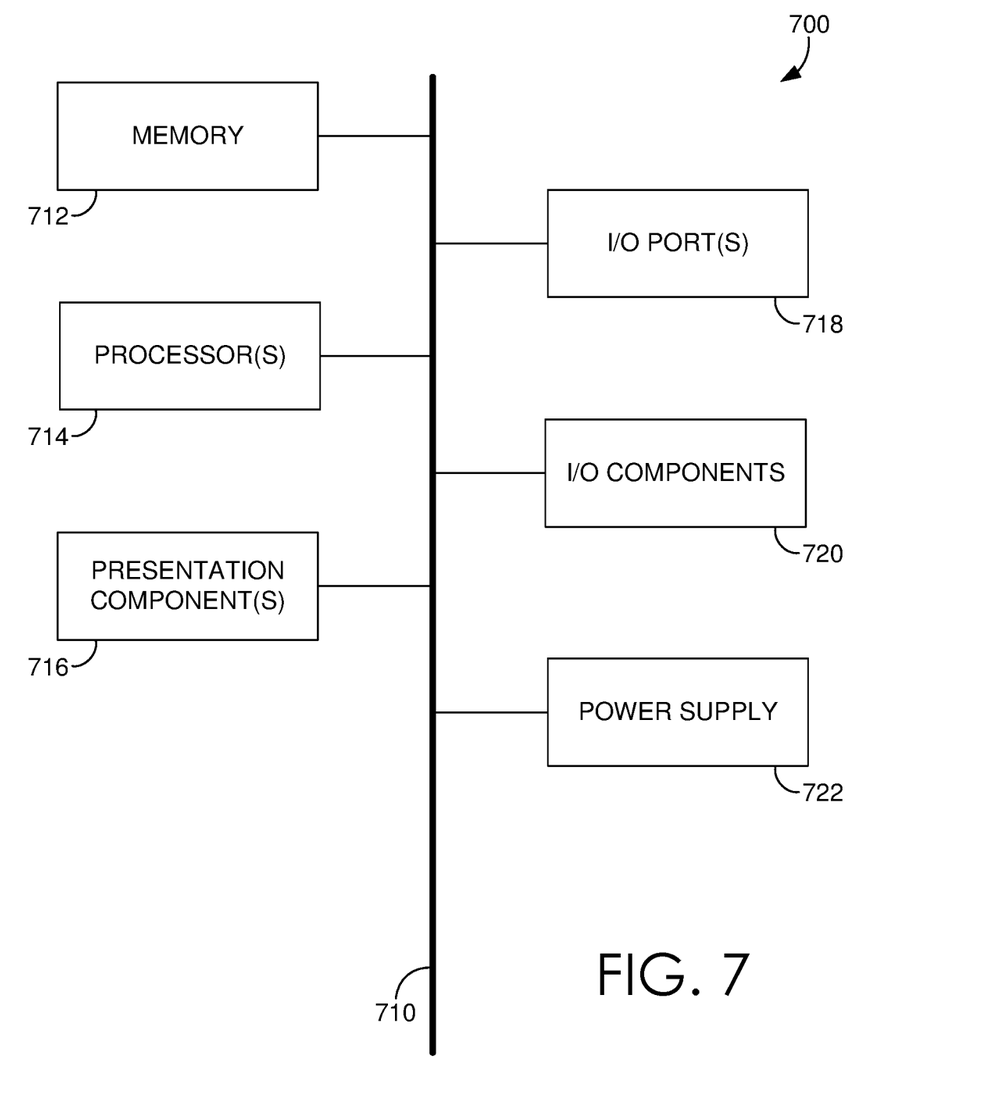
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. An access management system for providing resource policy management for distributed computing environments based on resource-ownership policy operations, the system comprising:
   one or more processors; and
   one or more computer storage media storing computer-useable instructions that, when used by the one or more processors, cause the one or more processors to execute:
   using a self-service engine, generating a policy for a resource instance, wherein an entity of a plurality of entities is assigned ownership of the resource instance, wherein the resource instance is part of a distributed computing environment having a plurality of resource instances and a plurality of policies;
   assigning ownership of the policy to the entity;
   communicating the policy to cause implementation of the policy on the resource instance;
   using a runtime policy evaluation engine, identifying the resource instance;
   determining ownership of the resource instance, wherein determining the ownership of the resource instance indicates ownership of the resource instance is assigned to the entity, wherein determining the ownership of the resource instance indicates ownership of the resource instance is not assigned to the entity causes bypassing application of the policy to the resource instance;

based on determining that ownership of the resource is assigned to the entity, identifying the policy, wherein ownership of the policy is assigned to the entity; and applying the policy to the resource instance based on the entity being assigned ownership of both the policy and the resource instance.

2. The system of claim 1, further comprising, using the self-service engine, generating a second policy for a second resource instance, wherein the entity is not assigned ownership of the second resource instance, wherein generating the second policy for the entity not assigned ownership of the second resource instance does not trigger an error indicating that the entity is not assigned ownership of the second resource instance; and communicating the second policy to cause implementation of the second policy on the second resource instance.

3. The system of claim 2, further comprising, using the runtime policy evaluation engine, identifying the second resource instance;

determining ownership of the second resource instance, wherein determining the ownership of the second resource instance indicates ownership of the second resource is not assigned to the entity; and bypassing application of the second policy on the second resource instance.

4. The system of claim 1, wherein for the plurality of resource instances and the plurality of policies in the distributed computing environment have corresponding ownership attributes, wherein an ownership attribute indicates that ownership is assigned to one or more entities.

5. The system of claim 1, wherein determining ownership of the resource instance is based on:

identifying a resource type of the resource instance;

filtering the plurality of resource instances based on the resource type; and identifying the entity from the plurality of entities assigned ownership of a plurality of filtered resource instances having the resource type of the resource instance.

6. The system of claim 1, wherein the plurality of policies are each categorized into two or more zones, wherein policies in a zone with a higher priority supersede policies in a zone with a lower priority.

7. The system of claim 1, further comprising the self-service engine configured to execute a diagnosis operation, wherein the diagnosis operation comprises parsing relevant policies for a diagnosis request policy and communicating the policy diagnosis results.

8. One or more computer storage media having computer-executable instructions embodied thereon that, when executed, by one or more processors, cause the one or more processors to perform a method for providing resource policy management for distributed computing environments based on resource-ownership policy operations, the method comprising:

accessing a policy, wherein the policy is generated at a self-service engine that supports generating a plurality of policies for a plurality of resource instances in a distributed computing environment, wherein a plurality of entities are assigned ownership of the plurality of resource instances and the plurality of policies;

identifying a resource instance;

determining ownership of the resource instance, wherein determining the ownership of the resource instance indicates ownership of the resource instance is assigned to the entity, wherein determining the ownership of the resource instance indicates ownership of the resource instance is not assigned to the entity causes bypassing application of the policy to the resource instance;

based on determining that ownership of the resource is assigned to the entity, identifying the policy, wherein ownership of the policy is assigned to the entity; and applying the policy to the resource instance based on the entity being assigned ownership of both the policy and the resource instance.

9. The media of claim 8, the method further comprising:

generating a second policy for a second resource instance, wherein the entity is not assigned ownership of the second resource instance, wherein generating the second policy for the entity not assigned ownership of the second resource instance does not trigger an error indicating that the entity is not assigned ownership of the second resource instance; and communicating the second policy to cause implementation of the second policy on the second resource instance.

10. The media of claim 9, the method further comprising:

identifying the second resource instance;

determining ownership of the second resource instance, wherein determining the ownership of the second resource instance indicates ownership of the second resource is not assigned to the entity; and bypassing application of the second policy on the second resource instance.

11. The media of claim 8, wherein for the plurality of resource instances and the plurality of policies in the distributed computing environment have corresponding ownership attributes, wherein an ownership attribute indicates that ownership is assigned to one or more entities.

12. The media of claim 8, wherein determining ownership of the resource instance is based on:

identifying a resource type of the resource instance;

filtering the plurality of resource instances based on the resource type; and identifying the entity from the plurality of entities assigned ownership of a plurality of filtered resource instances having the resource type of the resource instance.

13. The media of claim 8, wherein the plurality of policies are each categorized into two or more zones, wherein policies in a zone with a higher priority supersede policies in a zone with a lower priority.

14. The media of claim 8, further comprising executing a diagnosis operation, wherein the diagnosis operation comprises parsing relevant policies for a diagnosis request policy and communicating the policy diagnosis results.

15. A computer-implemented method for resource policy management for distributed computing environments based on resource-ownership policy operations, the method comprising:

accessing a policy, wherein the policy is generated at a self-service engine that support generating a plurality of policies for a plurality of resource instances in a distributed computing environment, wherein a plurality of entities are assigned ownership of the plurality of resource instances and the plurality of policies;

identifying a resource instance;

determining ownership of the resource instance, wherein determining the ownership of the resource instance indicates ownership of the resource instance is assigned to the entity, wherein determining the ownership of the resource instance indicates ownership of the resource instance is not assigned to the entity causes bypassing application of the policy to the resource instance;

based on determining that ownership of the resource is assigned to the entity, identifying the policy, wherein ownership of the policy is assigned to the entity; and applying the policy to the resource instance based on the entity being assigned ownership of both the policy and the resource instance.

16. The method of claim 15, the method further comprising:

generating a second policy for a second resource instance, wherein the entity is not assigned ownership of the second resource instance, wherein generating the second policy for the entity not assigned ownership of the second resource instance does not trigger an error indicating that the entity is not assigned ownership of the second resource instance; and communicating the second policy to cause implementation of the second policy on the second resource instance.

17. The method of claim 16, the method further comprising:

identifying the second resource instance;

determining ownership of the second resource instance, wherein determining the ownership of the second resource instance indicates ownership of the second resource is not assigned to the entity; and bypassing application of the second policy on the second resource instance.

18. The method of claim 15, wherein for the plurality of resource instances and the plurality of policies in the distributed computing environment have corresponding ownership attributes, wherein an ownership attribute indicates that ownership is assigned to one or more entities.

19. The method of claim 15, wherein determining ownership of the resource instance is based on:

identifying a resource type of the resource instance;

filtering the plurality of resource instances based on the resource type; and identifying the entity from the plurality of entities assigned ownership of resource instances having the resource type of the resource instance.

20. The method of claim 15, the method further comprising:

executing a diagnosis operation, wherein the diagnosis operation comprises parsing relevant policies for a diagnosis request policy and communicating the policy diagnosis results.

* * * * *